UNITED STATES PATENT OFFICE.

EBENEZER KENNARD MITTING, OF CHICAGO, ILLINOIS, ASSIGNOR, BY DIRECT AND MESNE ASSIGNMENTS, TO JAMES S. KIRK & CO., OF SAME PLACE.

PURIFYING SALT.

SPECIFICATION forming part of Reissued Letters Patent No. 11,125, dated November 18, 1890.

Original No. 431,986, dated July 8, 1890. Application for reissue filed October 9, 1890. Serial No. 367,594.

*To all whom it may concern:*

Be it known that I, EBENEZER KENNARD MITTING, a subject of the Queen of Great Britain and Ireland, residing at Chicago, in the county of Cook and State of Illinois, have invented certain new and useful Improvements in Purifying Salt Recovered from Spent Soap-Lye, of which the following is a specification.

The salt recovered from spent soap-lye by the concentration thereof in the manufacture of crude glycerine therefrom and in the distillation of such glycerine is contaminated with impurities which can only with considerable difficulty and expense be completely removed. The soap-lye before final concentration and distillation is usually submitted to a more or less complete chemical treatment with the object of removing extraneous impurities, and according to the skill and success which has attended this previous treatment of the lye so will the amount of the impurities in the salt precipitated therefrom vary. The salt thus produced has hitherto, in the case where the lye has been previously treated in the best manner chemically, been purified as far as possible by washing it with its own mother-liquor and with clean brine, and thus brought into a condition for use again in the manufacture of soap, while in cases where the lye has not been chemically treated such salt has been thrown away, as it could not be made available for use in the arts without expensive dissolving, treating, filtering of the solution, and recrystallization.

The impurities to be removed may be conveniently divided into two classes.

First. Organic, consisting of fatty, resinous, and albuminous matters and the like. The preliminary chemical treatment of the lye is generally directed to the complete removal of these impurities therefrom, and by careful application of the best-known methods this can be very nearly accomplished; but even by exercising the utmost care and skill a small variable quantity of organic matter remains in the lye, (giving color thereto,) and this is in part always carried down with and adheres to the salts precipitated during the final concentration and subsequent distillation of the concentrated liquor.

Second. Inorganic, consisting for the most part of metallic impurities from the vessels in which the lye has been treated, concentrated, or distilled. These impurities are most commonly met with in the form of oxide of iron or fine particles of metallic iron (which rapidly oxidize on exposure to air) from the vessels of iron or steel usually employed in the concentration or distillation and are precipitated from the liquor together with the crystallized salts. The concentration is usually effected in vessels of iron or steel with mechanical scrapers (or in small factories scraping-bars worked by hand) or equivalent devices for keeping the heated surfaces of such vessels clean and free from incrusting or adhering salt. The concentration in such vessels is usually carried on continuously, fresh liquor being fed in to replace the water evaporated, and the precipitated salt being removed from time to time as formed, and this operation goes on for several days until the concentration-point is reached and the vessel contains crude glycerine. During the early part of such concentration the liquor is thin—*i. e.*, poor in glycerine—and the "bite" of the scraper or scraping-bar upon the heated surfaces of the vessel is good, and consequently at this stage the principal impurities found in the salt are of the metallic kind, being fine particles of iron or steel from the natural wear of the scrapers and surfaces of the concentrating-vessels. On the other hand, during the latter part of the concentration the liquor becomes much stronger, and the presence of the glycerine lubricates the scraping devices and the surfaces of the vessels, and thus the bite of the scraper is not so good, and a comparatively small quantity of the metallic impurities now find their way into the salt, while the organic impurities above referred to have accumulated by concentration, and it is this class which now has to be dealt with by the process and sub-process forming claims 2 and 1, respectively. At the intermediate point during concentration the salt contains both classes of impurities and is treated by the process and sub-process forming claims 3, 4, and 5.

The object of this invention is to cheaply and easily purify such salt from the above-mentioned impurities and render it fit for edible and culinary purposes and any use in the arts.

My invention is based upon the fact that I have discovered that the impurities in the first class (organic) are soluble in a saturated solution of salt, which has been rendered alkaline by the addition of a small percentage of free alkali—such as carbonate of soda or caustic soda—and that the impurities in the second class (inorganic) are soluble in a similar solution, which has been acidified by the addition of a small percentage of a suitable acid, such as hydrochloric acid.

In carrying out my invention I proceed as follows: I take the precipitated salts, which may have been washed in their own mother-liquor or in brine, to remove, as far as possible, the adhering glycerine, and treat or wash them with a saturated solution of salt, to which has been added a small percentage of an alkali, such as carbonate of soda or caustic soda. The organic matters are dissolved by this solution, (which being saturated cannot dissolve any more salt,) which I now draw off. According to the degree of impurity present in the salt, it may be necessary to repeat this treatment, which is complete when the washing-liquor does not take up any more color from the salt, which is now freed from organic impurities, but still contains particles of the aforementioned inorganic impurities. To remove these, I next treat or wash the salts with a saturated solution of salt which has been made acid by the addition of a small quantity of a convenient acid—such as hydrochloric acid—which readily dissolves the finely-divided metallic impurities, becoming colored thereby. This I draw off exactly as in the case of the alkaline solution previously used. It may be necessary to repeat this treatment, though one such washing is generally sufficient. I next treat or wash the salts with one or more charges of a neutral saturated solution of salt until such liquor shows no trace of free acid or metallic impurity, and, finally, dry the salt, which is now quite free from organic and metallic impurities, quite white, in fine physical condition, and fit for table use. By preference I blow air through the mixture of salt and washing-liquors during the above-mentioned operation, thereby oxidizing the impurities and rendering them the more readily soluble, and I also, in some cases, treat or wash the salt with a neutral saturated solution of salt to remove any traces of the alkaline washing-solution previous to treating or washing with the acid solution.

I next remove the impurities from the washing-liquors, and thus render such liquors fit for use again in the following manner: To the alkaline washing-liquor (which may be used on successive quantities of salt until it has become saturated with organic matters) I now add a small excess of acid—for example, hydrochloric acid, which precipitates the organic matters therefrom—and to the acid washing-liquor, I add a small excess of alkali, by preference carbonate of soda, which in a similar manner precipitates the metallic impurities therefrom. I remove the precipitates from these liquors by decantation or filtration and thus produce new alkaline and acid solutions for further use; or I may mix these two clear solutions together and correct any alkalinity or acidity by the addition of a small quantity of acid or alkali, respectively, and thus produce a new charge of neutral brine.

In the case of using weak solutions of acid or alkali for effecting these operations I restore the revivified washing-liquors to full saturation-point by the addition of a small percentage of salt, as will be readily understood, and on the other hand any salt which is precipitated from such liquors (for instance, by the addition of strong hydrochloric acid to saturated brine) I wash free from acid and add to the common stock, while the salt produced by the union of the small quantities of acid and alkali continually used I recover by occasionally evaporating a portion of the brine.

I do not confine myself to any exact proportions of acid or alkali to be added to the saturated solution of salt used in washing the salt, or the quantities of such solution, as such proportions and quantities will necessarily vary in accordance with the amount of impurity which has to be removed in each case; nor do I confine myself to the order in which said solutions are used or the temperature at which the operations are conducted; but, as a general rule, I prefer to use such solutions at an elevated temperature—say from 150° to 200° Fahrenheit.

My invention relates only to the purification of salt recovered from spent soap-lye, which contains special impurities, for the removal of which my process is eminently adapted and successful.

I do not claim the applicability or use of my process in washing or purifying common salt—*i. e.*, the "natural product" so termed—which contains impurities of a different nature to those found in the salt recovered from spent soap-lyes, but to which, nevertheless, some steps of my process as herein described may be applicable.

I claim—

1. In the process of purifying the salt recovered from spent soap-lye, the improvement which consists in treating or washing said salt with a saturated solution of salt to which has been added a small proportion of alkali, substantially as described.

2. In the process of purifying the salt recovered from spent soap-lye, the improvement which consists in treating or washing the salt with a saturated solution of salt to which has been added a small proportion of free alkali, whereby to dissolve and remove organic impurities, and then treating or washing it with a neutral saturated solution of salt to remove any remaining alkali therefrom.

3. In the process of purifying the salt recovered from spent soap-lye, the improvement which consists in treating or washing said salt with a saturated solution of salt to which has been added a small proportion of alkali, and with a similar saturated solution of salt to which has been added a small proportion of acid, substantially as described.

4. In the process of purifying the salt recovered from spent soap-lye, the improvement which consists in treating or washing said salt with an alkaline saturated solution of salt to dissolve and remove organic impurities, then with a neutral saturated solution of salt to remove any traces of alkali, and with an acidified saturated solution of salt to remove metallic impurities, substantially as described.

5. In the process of purifying the salt recovered from spent soap-lye, the improvement which consists in treating or washing said salt with an alkaline saturated solution of salt and an acid saturated solution of salt, and finally with a neutral saturated solution of salt, substantially as described.

6. In the process of purifying the salt recovered from spent soap-lye, the improvement which consists in treating or washing the salt with an alkaline saturated solution of salt and then adding an acid to said solution to precipitate the impurities therefrom, and thus rendering the solution fit for use again, substantially as described.

7. In the process of purifying the salt recovered from spent soap-lye, the improvement which consists in treating or washing the salt with an acidified saturated solution of salt and then adding an alkali to said solution to precipitate the impurities therefrom, and thus render the solution fit for use again, substantially as described.

EBENEZER KENNARD MITTING.

Witnesses:
FREDERICK C. GOODWIN,
C. C. LINTHICUM.